United States Patent

Bonyhard et al.

[15] 3,701,132

[45] Oct. 24, 1972

[54] DYNAMIC REALLOCATION OF INFORMATION ON SERIAL STORAGE ARRANGEMENTS

[72] Inventors: Peter Istvan Bonyhard, Edison; Terence John Nelson, New Providence, both of N.J.

[73] Assignee: Bell Telephone Laboratories, Incorporated, Murray Hill, N.J.

[22] Filed: Oct. 27, 1971

[21] Appl. No.: 192,834

[52] U.S. Cl. ........................340/174 TF, 340/174 SR

[51] Int. Cl...........................G11c 11/14, G11c 19/00

[58] Field of Search ...................340/174 TF, 174 SR

[56] References Cited

UNITED STATES PATENTS

| | | | |
|---|---|---|---|
| 3,670,313 | 6/1972 | Beausoleil et al. | 340/174 SR |
| 3,523,286 | 8/1970 | Bobeck et al. | 340/174 TF |
| 3,613,056 | 10/1971 | Bobeck et al. | 340/174 TF |
| 3,618,054 | 11/1971 | Bonyhard et al. | 340/174 TF |

OTHER PUBLICATIONS

IBM Technical Disclosure Bulletin, " Angelfish Logical Connectives For Bubble Domains" by Almasi et al., Vol. 13, No. 10, 3/71, p. 2992, 2993

IBM Technical Disclosure Bulletin, " Improvement of Data Rate In Cylindrical Domain Devices" by Genovese et al., Vol. 13, No. 11, 4/71, p. 3299, 3,000

*Primary Examiner*—Stanley M. Urynowicz, Jr.
*Attorney*—R. J. Guenther et al.

[57] ABSTRACT

The field access mode of operating a single-wall domain mass memory is adapted for the reordering of stored information depending on the recency of use of the information. The memory is organized in the familiar major-minor loop arrangement where information is transferred from minor loops to the major loop for write and read operations. Reordering is permitted by a modification of the elements which define the major loop.

19 Claims, 13 Drawing Figures

DYNAMIC REALLOCATION OF INFORMATION ON SERIAL STORAGE ARRANGEMENTS

FIELD OF THE INVENTION

This invention relates to memory arrangements in which information is stored in shift registers, for example, of the single-wall domain type commonly referred to as "bubble" devices.

BACKGROUND OF THE INVENTION

A single-wall magnetic domain and the use of domains of this type in mass memory arrangements are described in patent application Ser. No. 875,338 filed Nov. 10, 1969 for P. I. Bonyhard, U. F. Gianola and A. J. Perneski, now U.S. Pat. No. 3,618,054. To be specific, that application describes a memory in which the consecutive positions to which domains move in a layer of a suitable material are determined by a pattern of magnetically soft elements adjacent a surface of the layer in response to a magnetic field reorienting in the plane of the layer. The elements define a number of parallel, closed loop channels, referred to as "minor loops" about each of which information (domain patterns) circulates synchronously as the "in-plane" field reorients (viz, rotates).

The elements also define a single channel termed a "-major loop," along an axis vertical to the minor loops and arranged to accept information from the minor loops at "transfer positions" located where minor loops are most closely spaced from associated stages of the major loop. The major loop is operative as a temporary store to recirculate information so transferred past a write-read position prior to restoration of the information (or replacement information) to vacancies in minor loops created by the initial information transfer.

The present invention is directed to a memory organization in which information is stored in minor loops separated from the write-read position a number of stages determined by the "recency" of use of that information. The operation of the memory permits data positions to be reallocated dynamically, an operation which leads to relatively high data rates.

BRIEF DESCRIPTION OF THE INVENTION

To be specific, the present invention relates to a memory organization in which the dynamic reallocation of data is performed in the major loop of a major-minor memory arrangement. The magnetic elements which define the movement of domain patterns are modified, in position and geometry, in the major loop at the write-read position such that a selected bit of a set of bits transferred from the minor loops is trapped at a position adjacent the write-read position of the major loop illustratively in response to a reversal in direction of the rotating in-plane drive field. The elements also provide a by-pass path which simultaneously recirculates the remaining bits of the set in a manner to close the gap in the stored data stream left by the trapping of the selected bit, a result realized by defining the trap between two consecutive stages of the major loop. The trapped bit is reinserted into the data stream at a reference position, illustratively again by a reversal of the direction of rotation of the in-plane field, and the rearranged bits are subsequently returned to occupy the set of vacancies created when the data stream was first transferred from the minor loops.

The relative position of a selected binary word rather than a selected bit is changed by employing a number of memory planes in each of which a selected bit of the selected word is processed.

DETAILED DESCRIPTION

Figure 1:
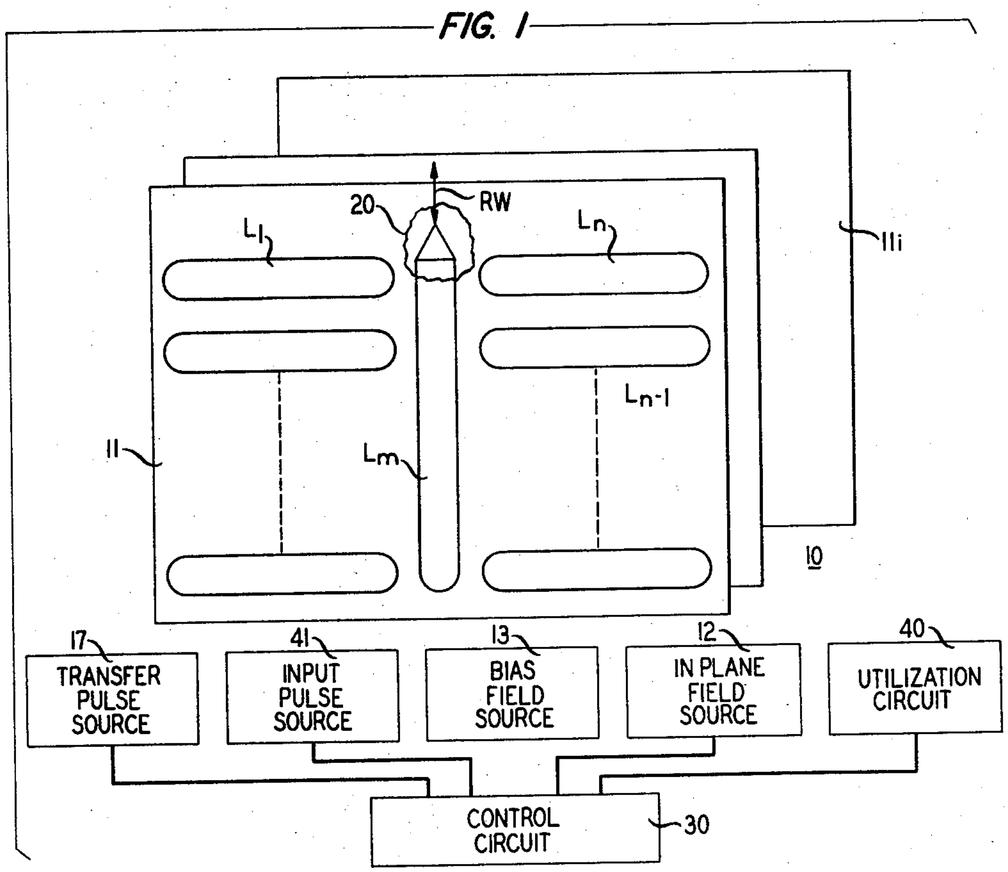
FIG. 1 is a schematic representation of a major-minor, single-wall domain memory in accordance with this invention.

FIG. 1 shows a single-wall domain memory organization 10 comprising a layer of material 11 in which single-wall domains can be moved. The movement of domain patterns in layer 11 is defined by elements of magnetically soft material, typically deposited by photolithographic techniques as an overlay on a suitable spacing layer (not shown) on the surface of layer 11. The elements are of geometries and so disposed with respect to one another to exhibit moving pole patterns in response to a rotating in-plane magnetic field to propagate domains in parallel in closed minor loops organized in right and left sets as represented in FIG. 1 by the elongated loops designated for simplicity Ll – Ln.

The overlay elements also define a single major loop shown as a vertically oriented elongated loop Lm in FIG. 1. As is well known, information is recirculated in the minor loops for transfer of selected data to the major loop where the data is advanced to a read-write position, designated schematically by double-headed arrow RW in FIG. 1. The selected data is subsequently transferred back to associated vacancies created in the minor loops by the initial transfer. The information in the major loop as well as in the minor loops is moved responsive to the in-plane field rotations and thus is synchronized by that field so that selected data is returned to the original positions in minor loops simply by the occurrence of a "data return" transfer operation at the appropriate number of field rotations after an initial data transfer assuming, for example, an equal number of stages in the major and minor loops.

Figure 2:
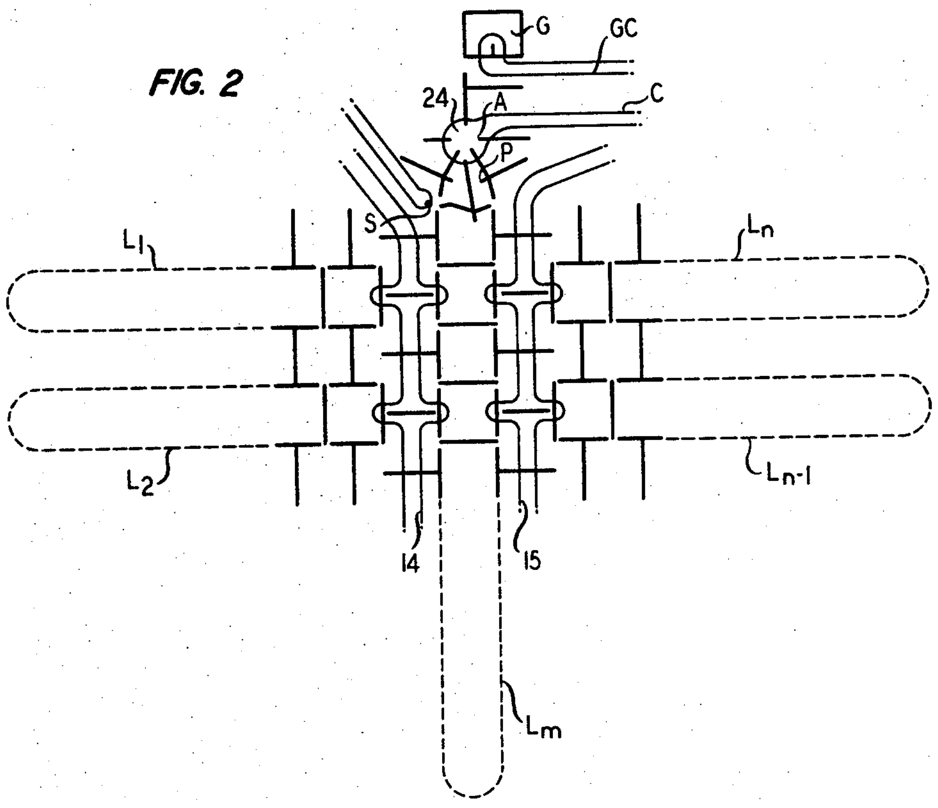
FIGS. 2–10 are schematic representations of a position of FIG. 1 showing the magnetic conditions thereof during operation.

The entire operation is determined by the overlay pattern of elements which is shown in some detail in FIG. 2 in conjunction with electrical conductors which are operative to perform various transfer, detection, and domain annihilation operations when pulsed.

To be specific, FIG. 2 shows illustrative T- and bar-shaped magnetically soft elements which respond to a rotating in-plane field to move domains in circular paths designated as in FIG. 1. The in-plane field is provided by well-known means represented in FIG. 1 by block 12. Domains moved in arrangements of this type are maintained at a nominal diameter by a bias field supplied by a source represented by block 13 in FIG. 1.

The minor loops extend laterally from the major loop being most closely spaced with respect to the major loop at what is commonly referred to as a transfer position. Representative electrical conductors 14 and 15 are shown serially coupled to the transfer positions to the left and right sides of the major loop, respectively.

The transfer conductors are connected to a transfer pulse source represented by block 17 in FIG. 1 and are operative as disclosed in copending application, Ser. No. 142,900 filed May 13, 1971 for A. H. Bobeck. The transfer arrangement and its operation are not described in detail herein because an understanding thereof is not necessary for an understanding of the present invention. Suffice it to say that, when pulsed, conductors 14 and 15 are operative to transfer domains between the minor and major loops. We will assume arbitrarily that two bits are transferred from each minor loop in order to occupy the major loop efficiently.

Figure 3:
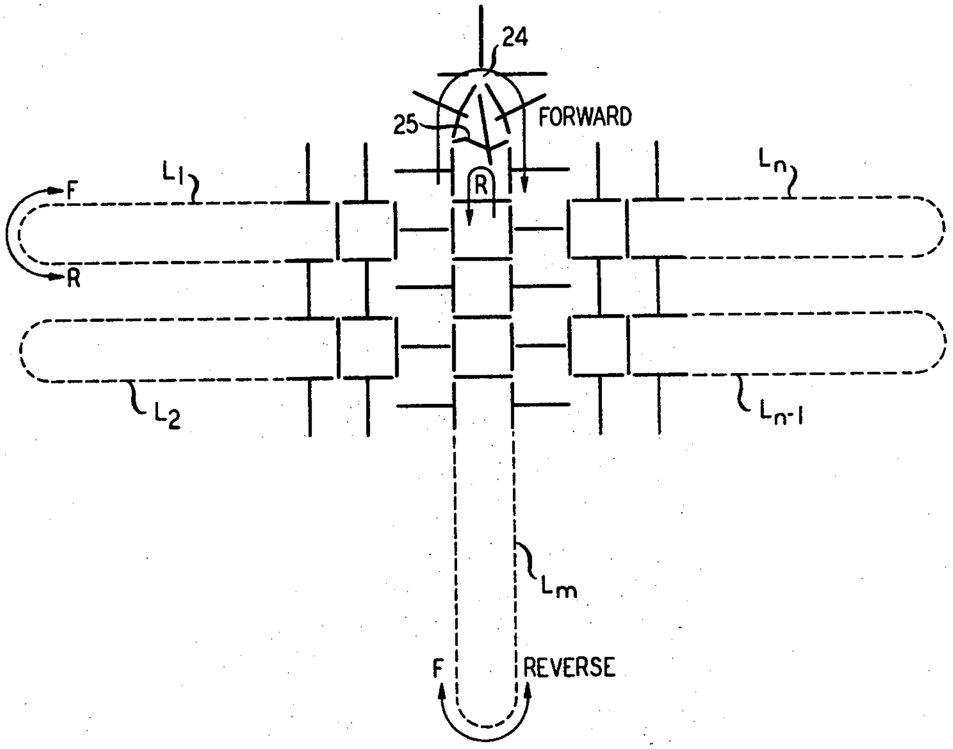

In accordance with this invention, modification of the overlay geometry in the major loop permits a change in the relative position of a selected bit of data in that loop. To be specific, the upper portion 20 of major loop Lm of FIG. 1 is defined by the overlay elements shown in FIG. 2 to operate differently depending on the direction of information flow (actually in-plane field rotation) in layer 11. In order to avoid confusion, we will adopt the convention that information flow clockwise will be termed "forward" and information flow counterclockwise will be termed "reverse" as indicated by the arrows designated "reverse" or "R" and "forward" or "F" in FIG. 3. Fields for achieving forward and reverse movements are counterclockwise and clockwise, respectively. The elements at the top of the major loop, in this context, are operative to move information forward along a path including a position 24 in FIGS. 2 and 3 and reverse along a by-pass path 25 which does not include position 24. When information flow is in the forward direction, a domain which occupies position 24 "sees" a stronger pole at P in FIG. 2 than at A and thus passes through the position. As a result, information moves forward around the major loop through position 24. On the other hand, a bit of information that occupies position 24 when information flow is reversed "idles" at position 24. That is to say, such a domain recirculates locally at position 24 in a familiar manner as the in-plane field rotates. The remainder of the information in the major loop continues to move in the reverse direction until the data stream is positioned so that the bit in position 24 can be, by means described hereinafter, repositioned at the head of the stream when forward movement is again resumed.

Figure 4:
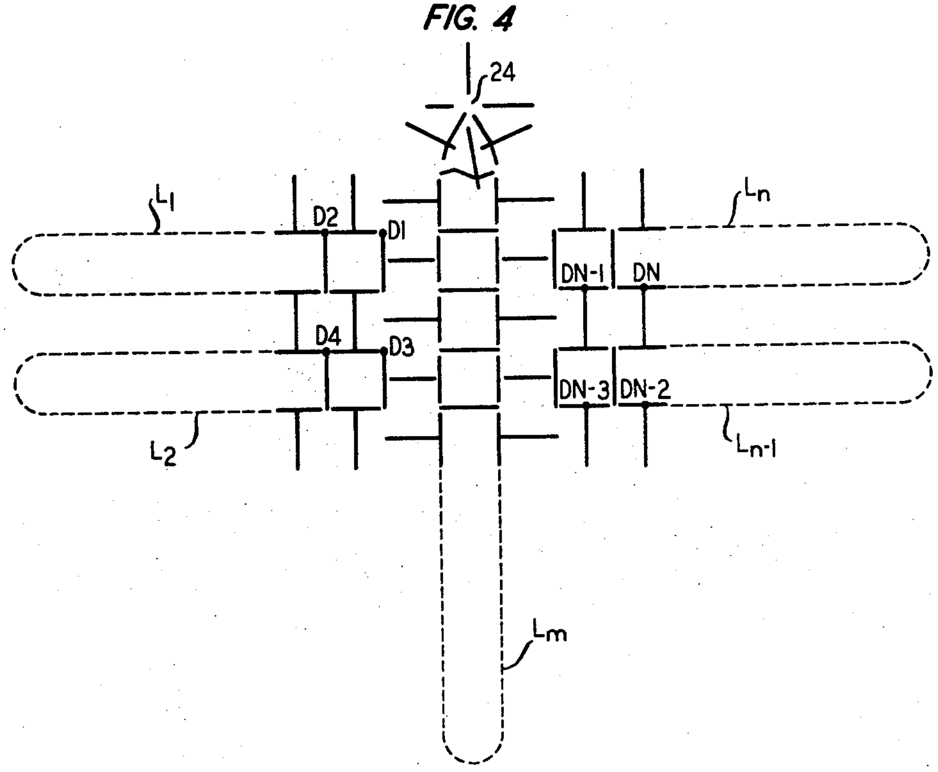

It is convenient to represent bits of information as dots which represent either the presence or absence of a domain in each instance. Consider pairs of dots (viz, two bits of information) moving forward in respective minor loops as shown in FIG. 4. The dots are designated D1, D2 through DN in a manner such that, upon transfer to the major loop during an illustrative operation, the designations are consecutive. When the information is returned to the minor loops after reallocation of position, the reallocation will be apparent from a comparison of the original and ultimate designations.

Figure 5:
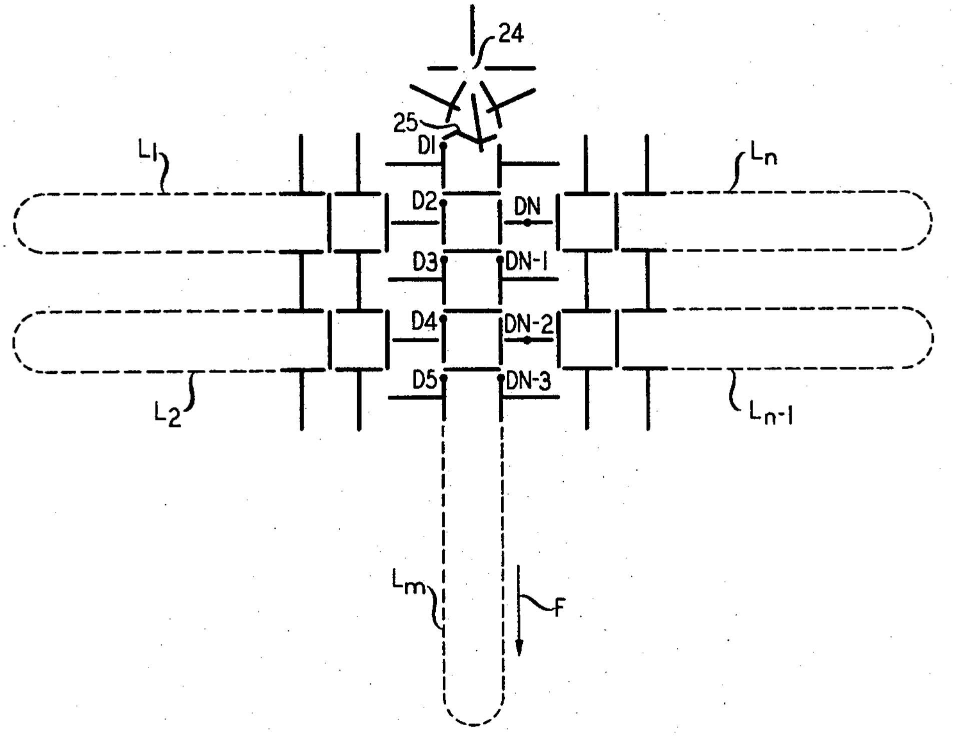

Before a transfer operation, then, the pertinent information (viz, pairs of dots) of data streams in the various minor loops is as shown in FIG. 4. After the transfer operation, which comprises two consecutive pulses in each of conductors 14 and 15 of FIG. 2 during two consecutive cycles of the in-plane field, the pertinent information is disposed as represented by the dots shown in FIG. 5. Note that the dot designations, at this juncture, are in sequence for forward movement and that two possible positions for domains (gaps) are left unoccupied (see FIG. 6) due to the overlay geometry. Note also, that dots DN and DN–2 are not yet entered fully into the major loop in FIG. 5 but will be entered during the completion of the present cycle of the in-plane field.

Figure 6:
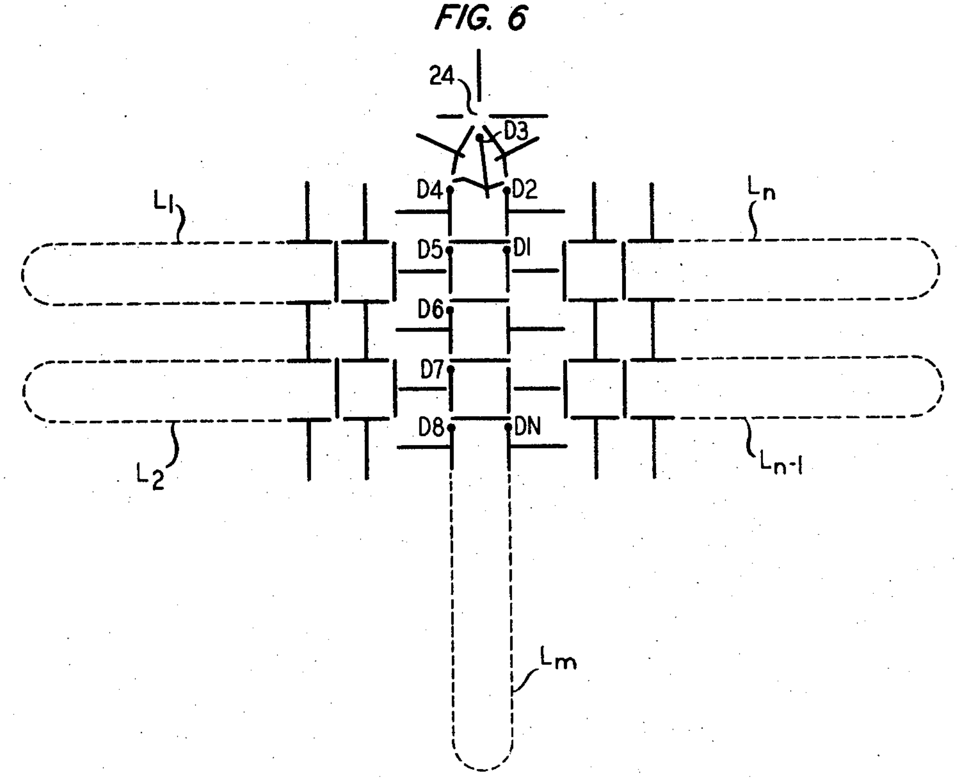

Three (forward) cycles of the in-plane field later, dot D3 enters position 24, dots D1 and D2 having passed through that position during the preceding two cycles. The disposition of information at this time is as shown in FIG. 6. We will take dot D3 as representative of the selected information (bit) that we want to reallocate to a different position.

The reallocation operation in the illustrative embodiment depends on the reversal of the direction of data flow when the selected bit occupies position 24. For selected dot D3, reversal occurs three cycles after the initial transfer operation when information is disposed as shown in FIG. 6. Control circuit 30 of FIG. 1 is responsive to the arrival of the selected bit at position 24 to so reverse the field in a manner to be discussed more fully hereinafter.

Figure 7:
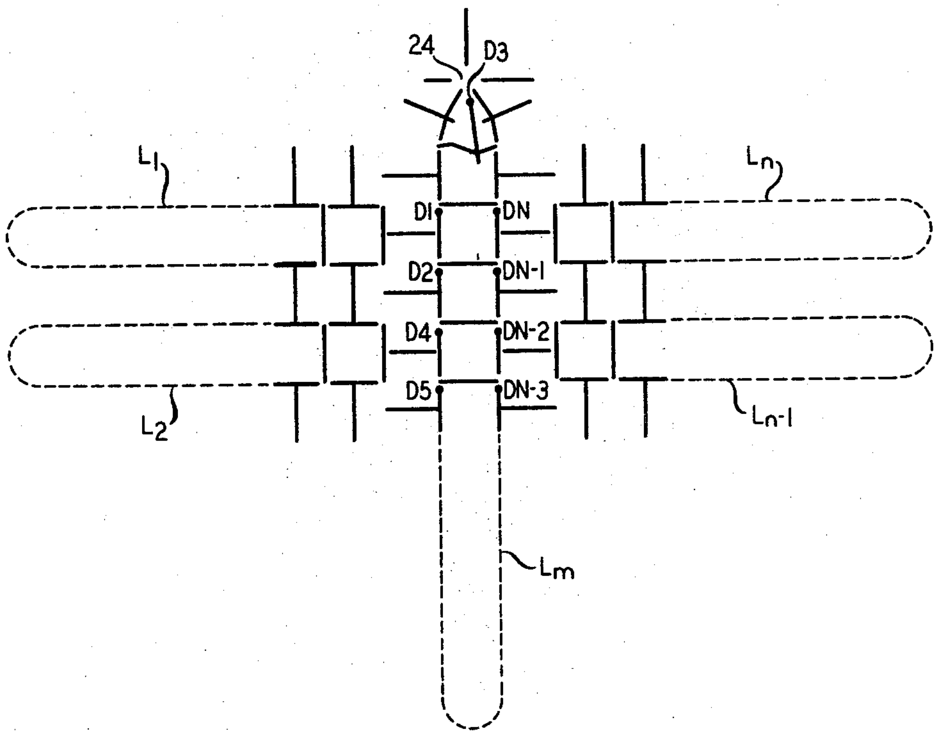

The object of the reversal is to move the data stream in the major loop in the reverse direction while the selected bit is idled at position 24 until information is disposed as shown in FIG. 7, a disposition achieved after three cycles of reverse field rotation for the illustrative operation. Notice in FIG. 7 that there is no gap in the data stream between dots D2 and D4, the original position of dot D3. This is consistent with the selection of the third bit in the data stream of FIG. 5.

Forward movement of information is now resumed under the control of circuit 30 of FIG. 1. One cycle later, position 24 is clear and information is disposed as shown by the dots in FIG. 8.

Figure 9:
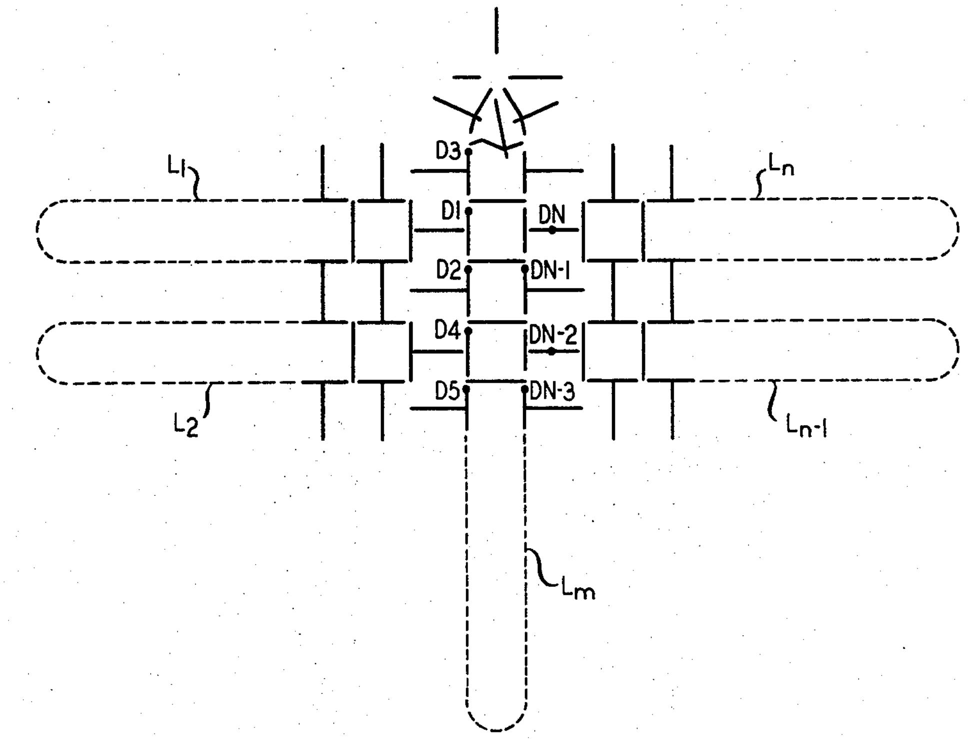

The in-plane field is again reversed at this juncture moving information to the positions represented by the dots in FIG. 9. The first return transfer pulse occurs at this juncture producing a complete transfer of most information and also resulting in the offset positions of dots (domains) DN and DN–2 in FIG. 9 due to the overlay geometry. The completion of the return transfer operation, which occurs during the present cycle of the in-plane field, results in the disposition of information as represented by the dots shown in FIG. 10.

Figure 10:
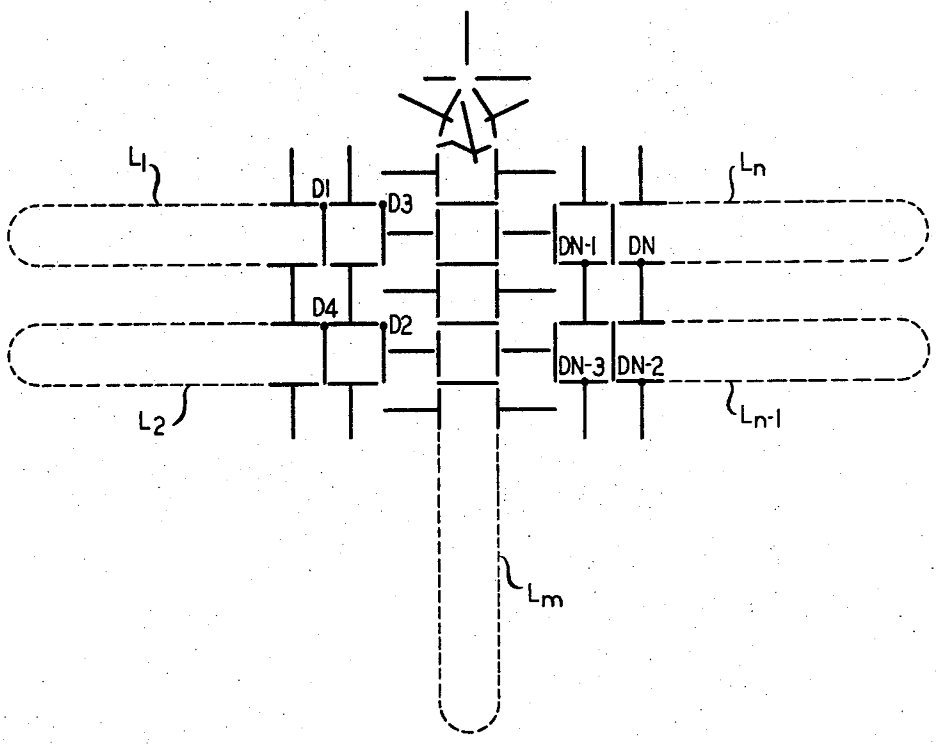

A comparison of FIGS. 4 and 10 shows that the positions of dots D1, D2, D3 and D4 have been changed. Dot D1, for example, is displaced by one position in the major loop. Note also that the reallocation of the position of dot D3 in the data stream in the major loop results in a change in the minor loop in which dot D3 ultimately is stored. Even so, when return transfer does occur, the vacancies created (for all dots shown) in the minor loops during the original transfer "occupy" the transfer positions for accepting the transferred information because of the synchronizing effect of the inplane field.

We have now demonstrated that an overlay pattern is operative to change the relative position of a bit in a data stream. The mechanism for achieving that change herein may be understood as an information trap which acts as a clutch to disengage a selected bit from the influence of the rotating in-plane field. So long as the mechanism for disengaging the selected bit is operative between consecutive stages and does not block the flow of the remainder of the data stream no gaps in the data stream occur as a result of the disengagement. In the illustrative embodiment, a single bit occupies a trap (or idler) and the overlay geometry is designed so that the input and output for the trap are at first and second consecutive stages in the normal propagation path. Consequently, disengagement without introducing gaps in the data stream is realized.

Figure 8:
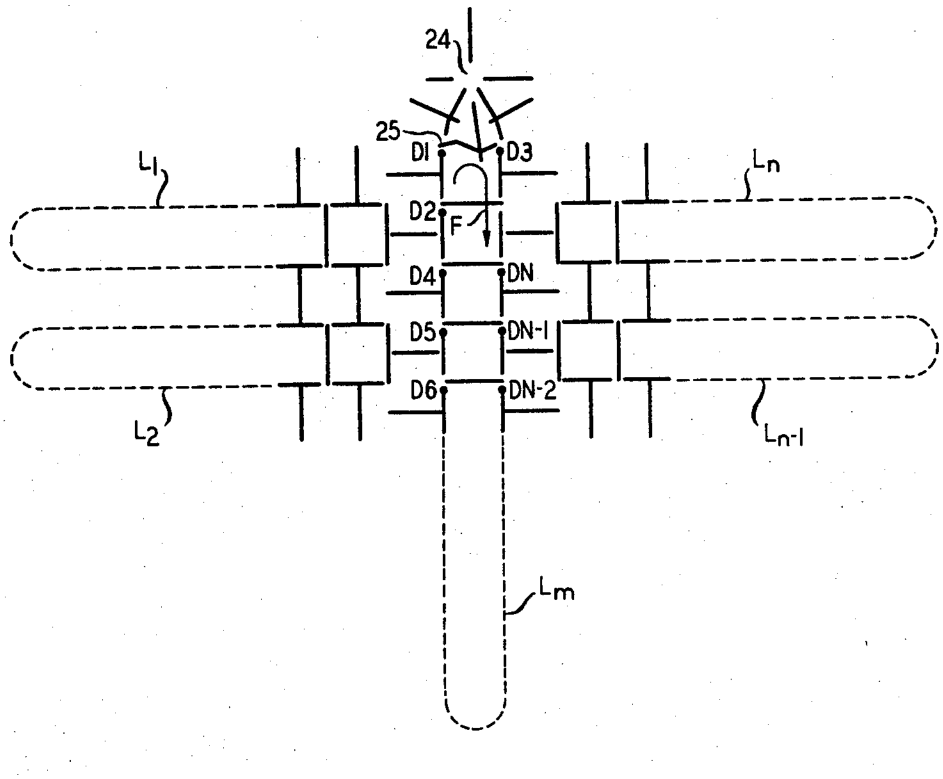

It is helpful to emphasize, at this juncture, that a bit such as D3 shown in a reallocated position in FIG. 8 is reallocated with respect to the minor loops shown in FIG. 10 and that, when transfer back to the minor loops occurs, that bit occupies an existing vacancy in the minor loops. This is true also if several planes 11 – 11*i* of FIG. 1 are employed in a three-dimensional memory arrangement for all bits D3 in those planes which have their positions similarly reallocated synchronously as described in connection with FIGS. 2 through 10, the situation which exists, for example, when all the planes are under the influence of the same in-plane field. The like designated bits in the planes (viz: dot D3 in each plane) may be thought of as constituting a binary word in which case the reallocation of a word in a sequence of words is seen to be accomplished.

For a three-dimensional memory comprising a plurality of memory planes of this type starting with bit D1 at a "head" position in each plane, the word of information comprising all bits D3 is read out initially after the third rotation of the in-plane field after transfer to the major loops occurs, at a time when information is positioned as shown in FIG. 6. After reallocation as described, read out of the reallocated word (D3) occurs during the first rotation of the in-plane field after transfer as is clear from FIG. 10.

Address bits are a part of each such binary word and are stored in bit planes included in the memory for addressing purposes. Transferred data is circulated in major loops synchronously until a selected address is recognized at which time readout occurs. Control circuit 30 of FIG. 1 is assumed to include circuitry for this purpose.

A readout operation occurs when the selected information occupies positions consistent with that shown for dot D3 in FIG. 9, positions represented schematically by double-headed arrow RW in FIG. 1. Typically detection is accomplished by a magnetoresistive element S shown in FIG. 2 for applying a signal in a familiar manner to utilization circuit 40 of FIG. 1.

A write operation, on the other hand, results in the clearing of a selected word and the replacement of that word in memory. A suitable generator for this purpose, shown in FIG. 2 at G, is disclosed in copending application, Ser. No. 882,137, filed Dec. 4, 1969 now U.S. Pat. No. 3,611,331 for P. I. Bonyhard. A domain is generated at G in each plane during each cycle of the in-plane field if a pulse is applied to an associated conductor GC in FIG. 2 by an input pulse source represented by block 41 in FIG. 1. The information replaced (D3) is simultaneously annihilated from positions 24 by a collapse conductor C for each memory plane as shown in FIG. 2. Conductor C is connected to input pulse source 41 for this purpose.

Sources 12, 13, 17, and 41, and circuit 40 are under the control of control circuit 30. The various sources and circuits herein may be any such elements capable of operating in accordance with this invention.

It should be clear at this juncture that a memory can be organized in accordance with this invention such that overlay elements permit a change in the relative position of binary words in memory.

Before proceeding, it is important to note that the reallocation of a selected word is carried out in response to the detection of the selected word itself. That is to say, control circuit 30 is operative, responsive to the presence of a selected word in the read-write positions, to reverse the rotation direction of the in-plane field for carrying out the procedure discussed in connection with FIGS. 2 through 10.

The number of cycles of the in-plane field which occur between the transfer of information to the major loops and the recognition of the selected word at the read-write positions is stored by, for example, a simple counter circuit or a familiar housekeeping loop which may comprise an auxiliary domain propagation channel. A reversal of the in-plane field for an equal number of cycles results in the desired reallocation of the selected information, in each instance, to the minor loops (L1) closest to the read-write positions when a return transfer occurs. Circuit 30 is assumed to include a housekeeping or control loop for this purpose. A housekeeping loop suitable for this purpose is described in U.S. Pat. No. 3,508,225 of J. L. Smith, issued Apr. 21, 1970.

For the specific example where the word corresponding to dot D3 in FIG. 2 is selected, three cycles of the in-plane field, after transfer, result in the movement of the word to the read-write positions. A reversal of the direction of the field rotations for three cycles results in the movement of the selected word to the closest (head) positions. Concurrently in the major loops, all other words which were previously closer to the read-write positions than the selected word are moved simultaneously away from their initial positions by one--an operation similar to that of a pushdown list.

It may be recognized that ultimately, the words occupy positions in memory (minor loops) which are functions of how recently they were selected. This result along with a showing of the beneficial decrease in access times resulting from dynamic reallocation of data follow from the discussion immediately hereinafter.

Figure 11:
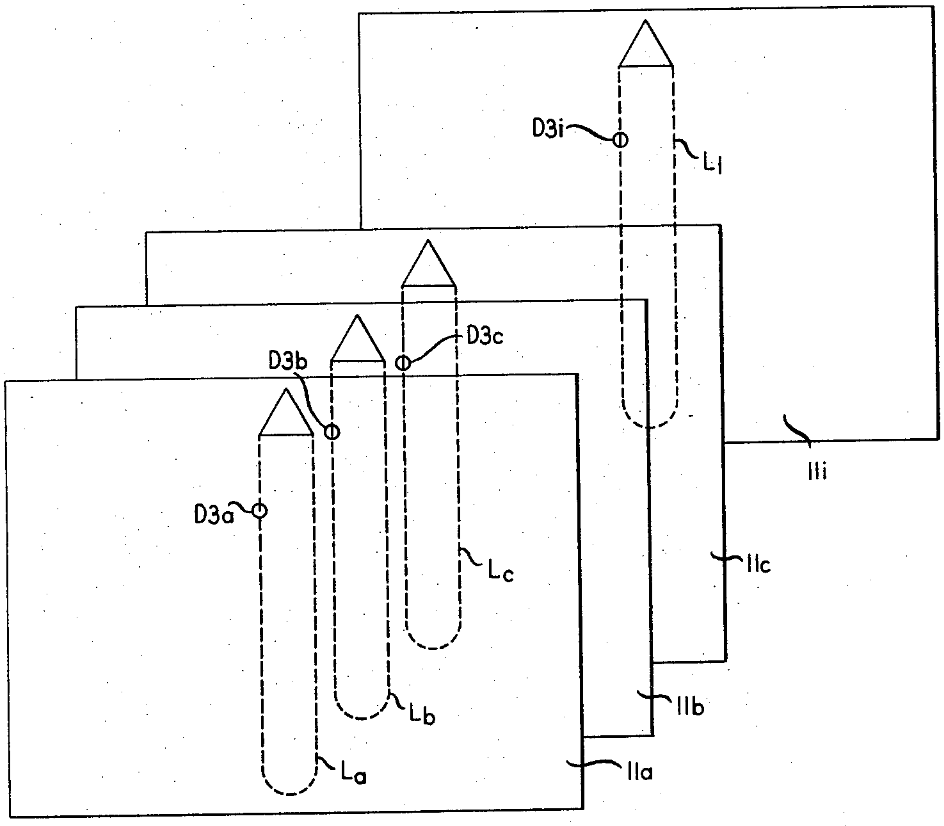
FIGS. 11, 12A, and 12B are schematic diagrams of the operation of memories of the type shown in FIG. 1.

Consider a hypothetical situation in which information loops Lm*a*, Lm*b*, Lmc etc. of memory planes 11*a* through 11*i* as shown in FIG. 11, are operated as closed loop shift registers in which information propagates synchronously under the influence of a common rotating inplane field. A word comprises the like-situated bit in each of the loops as represented by the black dots D3*a*, D3*b*, etc. in the figure. It is inherent in the dynamic reallocation scheme that each word carry its own reference address to which purpose some bits of each word are devoted, $\log_2$ of the number of words to be exact.

Figure 12A:
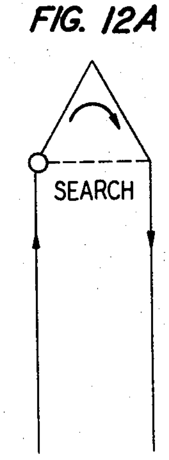

A request for a specified word, in this context, is operative to shift information forward in a search operation until detectors, located at S as in FIGS. 2 and 12A of each loop, detect the selected address. We will assume that detection occurs in X–1 forward propagation cycles and the word can be read in conventional fashion at that time or rewritten one cycle later. The memory is now reset by one further cycle of forward propagation followed by reversing the information flow X cycles as shown schematically in FIG. 12B. It should be apparent that the embodiment of FIGS. 1 through 10 is consistent with the schematic of FIGS. 11, 12A and 12B.

Let the physical word locations be numbered 1, 2, 3, through $n$ according to the number of stages from the detectors. The result of the reallocation algorithm is that a given word ultimately resides in a location, the number of which is equal to the number of requests for words residing in locations with numbers higher than the given word since the last request for the given word. The hypothetical arrangement known as the "stack" has the advantage that recently used words are on top and less recently used words are further down, that is in locations with increasingly higher numbers.

The average number of field cycles necessary to reach an addressed word in the stack can be calculated as follows: Let us consider the stack arbitrarily to be divided into two parts. One part is taken to consist of word locations 1, 2, through $K_i$. The other is taken to consist of words $K_i + 1$, $K_i + 2$ through $n$. It may be recognized that the first $K_i$ word locations can be through of as a buffer and the last $n - K_i$ word locations can be thought of as a memory in the terminology conventionally used for two-level memory hierarchies. When a word is moved from memory to the buffer, the word in the $K_i$th location moves from the buffer to the memory. Clearly the word in the $K_i$th location is the least recently used word in the buffer and the resulting replacement algorithm in this two-level hierarchy is "least recently used" (LRU).

The term "hit ratio" for this algorithm which defines the fraction of all requests which can be satisfied from the buffer without reference to the memory is defined in the literature and a known table of hit ratio data is repeated here as Table I:

TABLE I

Word Size (Bits)

| Buffer Size (Bits) | Classes | 128 | 256 | 512 | 2k | 4k | 8k |
|---|---|---|---|---|---|---|---|
| 8k | 1 | 0.894 | 0.915 | 0.928 | 0.884 | 0.792 | 0.495 |
| | 4 | 0.895 | 0.916 | 0.921 | 0.791 | —— | —— |
| | 16 | 0.891 | 0.903 | 0.860 | —— | —— | —— |
| | 64 | 0.857 | —— | —— | —— | —— | —— |
| 16k | 1 | 0.931 | 0.949 | 0.957 | 0.950 | 0.912 | 0.824 |
| | 4 | 0.931 | 0.948 | 0.954 | 0.933 | 0.808 | —— |
| | 16 | 0.930 | 0.943 | 0.943 | —— | —— | —— |
| | 64 | 0.921 | 0.913 | —— | —— | —— | —— |
| 32k | 1 | 0.951 | 0.969 | 0.973 | 0.977 | 0.966 | 0.939 |
| | 4 | 0.955 | 0.969 | 0.973 | 0.974 | 0.951 | 0.834 |
| | 16 | 0.955 | 0.968 | 0.972 | 0.933 | —— | —— |
| | 64 | 0.955 | 0.963 | 0.948 | —— | —— | —— |
| | 256 | 0.934 | —— | —— | —— | —— | —— |
| 64k | 1 | 0.977 | 0.986 | 0.988 | 0.987 | 0.987 | 0.984 |
| | 4 | 0.981 | 0.986 | 0.988 | 0.987 | 0.985 | 0.965 |
| | 16 | 0.981 | 0.985 | 0.988 | 0.983 | 0.954 | —— |
| | 64 | 0.979 | 0.984 | 0.985 | —— | —— | —— |
| | 256 | 0.974 | 0.971 | —— | —— | —— | —— |
| 128k | 1 | 0.985 | 0.993 | 0.994 | 0.993 | 0.992 | 0.944 |
| | 4 | 0.990 | 0.993 | 0.994 | 0.994 | 0.992 | 0.993 |
| | 16 | 0.990 | 0.994 | 0.995 | 0.995 | 0.991 | 0.957 |
| | 64 | 0.990 | 0.994 | 0.995 | 0.985 | —— | —— |
| | 256 | 0.989 | 0.992 | 0.986 | —— | —— | —— |
| 256k | 1 | 0.989 | 0.996 | 0.997 | 0.999 | 0.994 | 0.997 |
| | 16 | 0.994 | 0.996 | 0.997 | 0.998 | 0.996 | 0.997 |
| | 32 | 0.994 | 0.996 | 0.998 | 0.998 | 0.997 | 0.997 |
| | 64 | 0.994 | 0.996 | 0.998 | 0.998 | 0.988 | —— |
| | 256 | 0.994 | 0.996 | 0.997 | —— | —— | —— |

For the two-level hierarchy arbitrarily divided at the $K_i$th location, the number of bits per word is equal to the number of loops in FIG. 11, say $l$ loops. The number of bits in the buffer, consequently, is $lK_i$. If the corresponding hit ratio is $h_i$, then the average number of shifts per request $\bar{S}$ is:

$$(1)\quad \bar{S}=[(K_i-1)/2]\,h_i+[(n+K_i-1)/2]\,(1-h_i),$$

or, the average number of shifts in the buffer times the probability of a hit, plus the average number of shifts to the memory times the probability of a miss.

This treatment, of course, is extended to any number $m \leq n$ of levels by:

$$(2)\quad \bar{S}=\sum_{i=1}^{m}\frac{K_i+K_{i-1}-1}{2}\,(h_i-h_{i-1})$$

where $h_o=K_o=0$, $K_m=n$, and $h_m=1$. A good approximation to $\bar{S}$ is achieved when every value of $K$ between 1 and $n$ is taken into account, when $$(3)\quad \bar{S}\rightarrow\sum_{K=1}^{n}(K-1)\,(h_K-h_{K-1}).$$

This result is self-evident because $K-1$ is the number of cycles to the $K^{th}$ location and $h_K - h_{K-1}$ is the probability of hitting the $K^{th}$ location.

$\bar{S}$ has been calculated on the basis of equation (2) using the entries in the above Table I–$a$ pessimistic result due to the fact that the probability is taken to be divided equally amongst the levels. Actually, the probability is monotonically decreasing. The results are tabulated in Table II:

TABLE II

| No. of loops | 128 | 256 | 512 | 1K | 2K | 4K | 8K |
|---|---|---|---|---|---|---|---|
| Min. No. of bits per loop | 2K | 1K | 512 | 256 | 128 | 64 | 32 |
| Average No. of shifts | 57.8 | 25.9 | 12.13 | 5.67 | 3.08 | 1.44 | 1.05 |

The minimum number of bits per loop listed in Table II is based on an average program size of 256 K bits used in deriving the hit ratio data.

The foregoing formalism may be applied to the major-minor arrangements of FIGS. 1 through 10 as follows: First, let us designate all information (viz. the sequence of binary words) which may occupy the group formed by all major loops simultaneously as a class. A class is selected by shifting information in the minor loops to transfer positions and by then transferring the class into the major loops. Because of geometric considerations with respect to the overlay pattern, the major loops become fully occupied when two bits are transferred to them from each minor loop as described in copending application Ser. No. 128,889 filed Mar. 29, 1971 for D. Kish and J. L. Smith. If it is desired to occupy the major loops fully, as is consistent with the discussion in connection with FIGS. 1 through 10, transfer may be considered to be implemented as, for example, disclosed in that application. As has been stated hereinbefore, a pair of bits is transferred from each minor loop and the major loops are considered fully occupied in the mathematical treatment herein. If, on the other hand, only one bit is transferred from each minor loop, only every other position of the major loops is occupied.

Figure 12B:
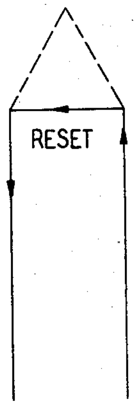

Once a class of information is transferred to the major loops, the group of major loops operates exactly as described in connection with FIGS. 11, 12a, and 12B. All the bits of a number of words are transferred into the major loop for sequential write or read operations, the dynamic reallocation operation functioning to reallocate words within classes but not between classes. It should be recognized that such reallocation does not affect the relationship between words and vacancies, vacancies always being present to receive information transferred from major loops so long as the number of stages in the various loops are consistent to this end as is well known.

The foregoing mathematical consideration relates to performance within the group of major loops only. The swapping of classes or, in other words, the movement of classes to the major loops may be treated similarly. For example, if we take a representative memory size of 2 million bits and an average program size of 256,000 bits, we see that an average of eight programs share the memory. Each of these programs resides in some number of contiguous classes which are termed "active classes" for the program currently being executed.

The adaptation of the foregoing mathematical treatment to the major-minor organization may be appreciated more fully if we consider the class in the major loops at a given time as being in a single class buffer of a two-level memory hierarchy for which the hit ratios are high—there being a high probability that the next request is addressed to a class already in the major loops. One desirable mode of operating consequently is to apply a request for a particular address prior to the return to minor loops of the information stored in the major loops incident to the processing of the next preceding requests and then to clear the major loops of that preceding information only when a "class failure" indication occurs. An auxiliary register stores the address of the class currently residing in the major loops for comparison with the address of the request for this purpose. The appropriate circuitry is considered included within circuit 30.

The average number of shifts, or in-plane field cycles necessary to move a new class into the major loops after a "class failure" indication occurs is now calculated. For this calculation, it is assumed that the selected program resides in $m$ consecutive classes and that the $i^{th}$ class was addressed last. Under these assumptions, it is reasonable to assume that each other class within the program has an equal likelihood of being addressed next. This leads to an average number of shifts (4)

$$\bar{S}_m=\frac{2}{m}\left(\sum_{j=1}^{i-1} j+\sum_{j=1}^{m-1} j\right)=\frac{(i-1)i}{m}+\frac{(m-i+1)(m-i)}{m}$$

for the case where there are two bits per word in each minor loop. But $i$ assumes all values between 1 and $m$ so that (5)

$$\bar{\bar{S}}_m=\frac{1}{m}\sum_{i=1}^{m}\bar{S}_m=\frac{2}{m^2}\sum_{i=1}^{m}(i-1)i=\frac{2}{3}\frac{m^2=1}{m}$$

For consistency, two additional shifts (cycles) are added to accomplish the transfer of two bits from each of the minor loops (in parallel) and the return of the bits to the minor loops. The total number of cycles for class swapping (CS) per request accordingly is (6) $S_{cs}=(1-h_{cs})(2/3)\,[(m^2-1)/m]+2)$, where $h_{cs}$ is the class hit ratio discussed above, and $m$ is the number of active classes.

A further consideration is the number of cycles necessary to reach a word within a selected class to obtain the total average number of cycles per request. The average number of cycles within a selected class is given by equation (2) or (3) with the hit ratios taken for the appropriate number of classes. The latter quantity must be doubled when calculating the average number of cycles for a complete operation which comprises the number of field cycles between consecutive requests. The results are shown in Table III for three different designs. The class hit ratios under A and B in Table III are extrapolations from the information in Table I for a 32$k$ and 16$k$ word size and for a 32$k$ and a 16$k$ bit buffer size, respectively.

TABLE III

| Design | A | B | C |
|---|---|---|---|
| Bits per memory | 2M | 2M | 2M |
| Planes per memory | 128 | 128 | 128 |
| Bits per plane | 16k | 16k | 16k |
| Classes | 64 | 128 | 256 |
| Bits per minor loop | 128 | 256 | 512 |
| Minor loops per plane | 128 | 64 | 32 |
| Bits per major loop | 256 | 128 | 64 |
| Active classes | 8 | 16 | 32 |
| Active bits per minor loop | 16 | 32 | 64 |
| Class hit ratio | ≈0.64 | ≈0.56 | 0.495 |
| Class swapping shifts | 7.25 | 12.55 | 23.3 |
| Class swapping shifts per request | 2.61 | 5.52 | 11.8 |
| Word search shifts | 7.00 | 3.26 | 1.40 |
| Total shifts per access | 9.61 | 8.78 | 13.2 |
| Total shifts per cycle | 16.61 | 12.04 | 14.6 |

Each of the designs has an overhead associated with it because of the extra planes needed to store the address (tags) of the reallocated word. The overhead for designs A, B, and C is 6.3 percent, 5.5 percent, and 4.7 percent, respectively. Design B requires 8.78 cycles or, assuming a realistic 1 megahertz data rate, an 8.78 microsecond cycle time.

This figure can be reduced further by use of the organization of FIGS. 1 through 7 in combination with a smaller submicrosecond cycle time core or integrated circuit buffer in a manner analogous to the use of such a buffer in a random access memory. When such a buffer is employed, the buffer is divided into as many classes as there are active classes in memory and the word length in the buffer is the same as in the memory. If there are $k_B$ words per class in the submicrosecond buffer, the words of all active classes currently residing in locations 1, 2, through $k_B$ also appear in that buffer.

We uniquely assign all nonactive memory classes to buffer classes so that program swapping can take place. In terms of design B, this is accomplished as follows: Let the seven most significant bits of a 14-bit word address represent the class address. Under the assumption that each program occupies contiguous classes, the four least significant bits of the class address refer to the classes in the same program for a typical program size. Thus the fourth through the seventh most significant bits of the word address may be considered to be the buffer class address.

The average number of shifts (cycles of in-plane field) necessary in the memory per request are shown in Table IV. If the buffer hit ratio is $h_B$, then $h_{cs}$ in equation (6) should be replaced by $h_B$, and all contributions to the word search shift in equation (2) or (3) for values $k_i \leq k_B$ should be neglected.

TABLE IV

| | | | | |
|---|---|---|---|---|
| Buffer size (bits) | 8k | 16k | 32k | 64k |
| Buffer bit ratio | 0.891 | 0.930 | 0.955 | 0.981 |
| Words per class in buffer | 4 | 8 | 16 | 32 |
| Class swapping shifts | 1.37 | 0.88 | 0.56 | 0.24 |
| Word search shifts | 1.92 | 1.71 | 1.42 | 0.81 |
| Total access shifts | 3.29 | 2.59 | 1.98 | 1.05 |
| Total shifts per cycle | 5.21 | 4.30 | 3.40 | 1.86 |

Consequently, a single-wall domain memory arrangement is organized in accordance with this invention to operate as a memory hierarchy by a modification of the geometry and disposition of magnetic elements which define propagation channels for domain in the arrangement and by controllably moving domain patterns in channels defined by those elements. The resulting arrangement exhibits relatively attractive access times which compare to access times of presently available high speed random access memories but at a relatively modest cost.

What has been described is considered merely illustrative of the principles of this invention. Therefore, various modifications can be devised by those skilled in the art in accordance with those principles within the spirit and scope of this invention. For example, inasmuch as other technologies such as MOS and charge-couple devices can be used to implement reversible shift register operation which can be operated within the "major-minor" organization described, such technologies can also be adapted to defining memory hierarchies in accordance with this invention. Further, the illustrative embodiment calls for two reversals of the in-plane field for carrying out the reallocation operation. Alternatively, a conductor pair (not shown) may be employed to prevent movement into or out of idler position 24 when pulsed. Such an active circuit would eliminate the need for a second reversal of the in-plane field. The foregoing mathematics does not take into account the second reversal and an additional two cycles, one forward, one reverse are necessary to make the mathematics entirely consistent with the illustrative embodiment.

What is claimed is:

1. An arrangement for changing the relative position of at least one bit in a data stream, said arrangement comprising means for selectively displacing said data stream including at least said one bit synchronously in first and second directions along a first path comprising a multistage information propagation channel which includes first and second consecutive stages, an auxiliary channel having a number of stages therein to correspond to the number of bits to be repositioned and also including said first and second stages as the first and last stages thereof, and means for defining said first path and said auxiliary path such that said data stream moves selectively in said first path including said auxiliary channel and in said first path alone in response to said data stream moving in said first and second directions, respectively.

2. An arrangement in accordance with claim 1 wherein said auxiliary channel comprises a single stage in addition to said first and last stages.

3. An arrangement in accordance with claim 1 wherein said data stream comprises a pattern of single wall domains in a layer of magnetic material in which said domains can be moved, and said means for displacing information in said propagation and said auxiliary channels includes a magnetic field reorienting in the plane of said layer, said arrangement comprising a pattern of elements coupled to said layer for defining said propagation and said auxiliary channels in said layer.

4. An arrangement in accordance with claim 3 wherein said pattern of elements comprises magnetically soft material adjacent the surface of said layer.

5. An arrangement in accordance with claim 4 wherein said auxiliary channel is defined by said pattern of elements in a manner such that a domain therein is recirculated there.

6. An arrangement in accordance with claim 5 wherein said means for selectively moving comprises a pattern of elements having a geometry and being disposed to displace domains in a first direction in said propagation and auxiliary channels in the presence of a magnetic field reorienting by rotation in a first direction in said plane and to displace domains in a second direction only in said propagation channel in the presence of a magnetic field reorienting by rotation in a second direction in said plane, and means for selectively rotating said in-plane field in first and second directions responsive to a first signal.

7. An arrangement in accordance with claim 6 wherein said pattern of elements which defines said auxiliary channel is adapted to pass domains therethrough in the presence of an in-plane field rotating in a first direction and to recirculate domains therein in the presence of an in-plane field rotating in said second direction.

8. An arrangement in accordance with claim 7 wherein said elements are adapted to circulate said data stream in said first path in a closed loop manner.

9. An arrangement in accordance with claim 8 wherein said elements also define a plurality of minor loops for recirculating data streams in a closed loop manner, each of said minor loops being spaced closely with respect to an associated stage of said propagation channel at a transfer stage therein.

10. An arrangement in accordance with claim 9 also including means responsive to a second signal for transmitting domains between said minor loops and said propagation channel at said transfer positions.

11. An arrangement for reallocating the position of selected information in data streams comprising a plurality of layers of materials in each of which single wall domains can be moved, a pattern of overlay elements for defining a propagation channel and a plurality of minor loops for displacing information thereabout in accordance with claim 9 in each of said layers, and means responsive to the presence of a selected word in said auxiliary channel for supplying said first signal.

12. A magnetic domain propagation arrangement comprising a layer of material in which single wall domains can be moved and a pattern of magnetic elements for defining in said layer a first multistage propagation channel including a first stage for moving domains therealong in response to a reorienting in-plane field, said elements defining a bypass path for propagating domains in said channel in a manner to avoid said first stage, said elements at said first stage being of a geometry and disposed to idle a domain there when the remaining domains are moved through said bypass path and means for moving domains through said first stage and through said bypass path selectively, said last-mentioned means comprises means for changing the reorientation sequence of said field for moving domains in first and second directions, said elements having geometries and being disposed to move said domains through said first stage and to move said domains through said by-pass path when said field is reorienting for moving domains in said first and second directions, respectively.

13. An arrangement in accordance with claim 12 wherein said elements also define a plurality of minor loops for moving domain patterns to transfer stages therein responsive to said reorienting in-plane field.

14. An arrangement in accordance with claim 13 including means for transferring domains between said transfer stages and associated stages in said first channel.

15. A magnetic domain propagation arrangement comprising a plurality of layers each of material in which single-wall domains can be moved, a pattern of elements for defining in each of said layers a major loop for moving domains thereabout in response to a reorienting in-plane field, said elements also defining a plurality of minor loops in each of said layers for circulating domains therein, said minor loops being closely spaced from associated positions of said major loops at transfer positions therein, means responsive to a first signal for transferring domains between said transfer positions in the minor loops of all of said layers and associated major loops to create data streams for circulation in said major loops for movement through first and second consecutive positions and for thereafter transferring information to vacancies created in associated minor loops during the next preceding transfer after passage through a first position therein, said elements defining an auxiliary path between each of said first and second positions, and means for selectively displacing said data streams in said major loops or in said major loops and said auxiliary paths.

16. A magnetic arrangement in accordance with claim 15 wherein each of said auxiliary paths comprises an idler position for passing data therethrough and for circulating a first bit of said data therein in response to said reorienting field reorienting in first and second directions, respectively.

17. A magnetic arrangement in accordance with claim 16 wherein said elements at each of said first positions also define a by-pass path for said data stream when said field is reorienting in said second direction.

18. A magnetic arrangement in accordance with claim 17 wherein said transferred domains constitute a class of binary words each of said words including an address and means responsive to a selected one of said addresses for changing the direction of said in-plane field for circulating the bits of a selected word in said first positions.

19. A magnetic domain propagation arrangement comprising a layer of material in which single wall domains can be moved, a pattern of magnetically soft overlay elements coupled to said layer for defining therein a plurality of minor loops and a first major loop including a first position, means responsive to a first signal for transferring domains from said minor loops to said major loop for movement past said first position in response to a magnetic field reorienting in a first direction in the plane of said layer, characterized in that said elements at said first position define a by-pass path for said domains through which path said domains are propagated in response to said field rotating in a second direction, said elements at said first position being designed to idle information there in response to said field reorienting in said second direction.

* * * * *